(12) United States Patent
Okamoto et al.

(10) Patent No.: US 6,490,234 B1
(45) Date of Patent: Dec. 3, 2002

(54) OPTICAL DISK REPRODUCING DEVICE

(75) Inventors: Naruhiro Okamoto, Kyoto (JP); Hiroshi Oyabu, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/525,015

(22) Filed: Mar. 14, 2000

(30) Foreign Application Priority Data

Mar. 15, 1999 (JP) .......................................... 11-068664
May 6, 1999 (JP) .......................................... 11-125880

(51) Int. Cl.$^7$ ................................................ G11B 7/00
(52) U.S. Cl. ..................... 369/44.25; 369/44.29; 369/53.28
(58) Field of Search .......................... 369/44.25, 44.26, 369/44.36, 94, 44.29, 53.28, 44.11

(56) References Cited

U.S. PATENT DOCUMENTS 5,748,584 A * 5/1998 Maezawa .................. 369/44.29
6,252,835 B1 * 6/2001 Choi ........................ 369/44.29

* cited by examiner

*Primary Examiner*—Nabil Hindi
(74) *Attorney, Agent, or Firm*—Mattingly, Stanger & Malur, P.C.

(57) ABSTRACT

Through a provision of a level holding circuit in a focus servo mechanism for an optical disk reproducing device, a detection signal level with regard to a focusing position error, when a detection signal corresponding to a received optical beam amount shows a maximum value under a condition when not being changed over to an automatic focus loop, is sampled as an offset amount and, is held in advance in the level holding circuit, and the thus held level is utilized for effecting an automatic focusing under a just focusing servo condition.

10 Claims, 5 Drawing Sheets

OPTICAL DISK REPRODUCING DEVICE

BACKGROUND OF THE INVENTION

1. Field of the Invention

The present invention relates to an optical disk reproducing device, and, more specifically, relates to an improvement in a focusing servo mechanism for an optical disk reproducing device which eliminates a disturbance injection, permits a focusing (an automatic focus control) with a further simple circuit, and increases an S/N ratio as well as unnecessitates a readjustment even when such as an external pick up unit is exchanged.

2. Conventional Art

Recently, with regard to CD-ROM devices, the data read out speed thereof is rapidly increasing, for example, from a double speed to 32 times speed or more than that speed, for this reason, it is required to read data in a speed range from double speed to 32 times speed or more that speed. Further, also with regard to optical disk memory devices, the memory density thereof is rapidly increasing, for example, to double, four times, six times, eight times and so on.

Figure 5:
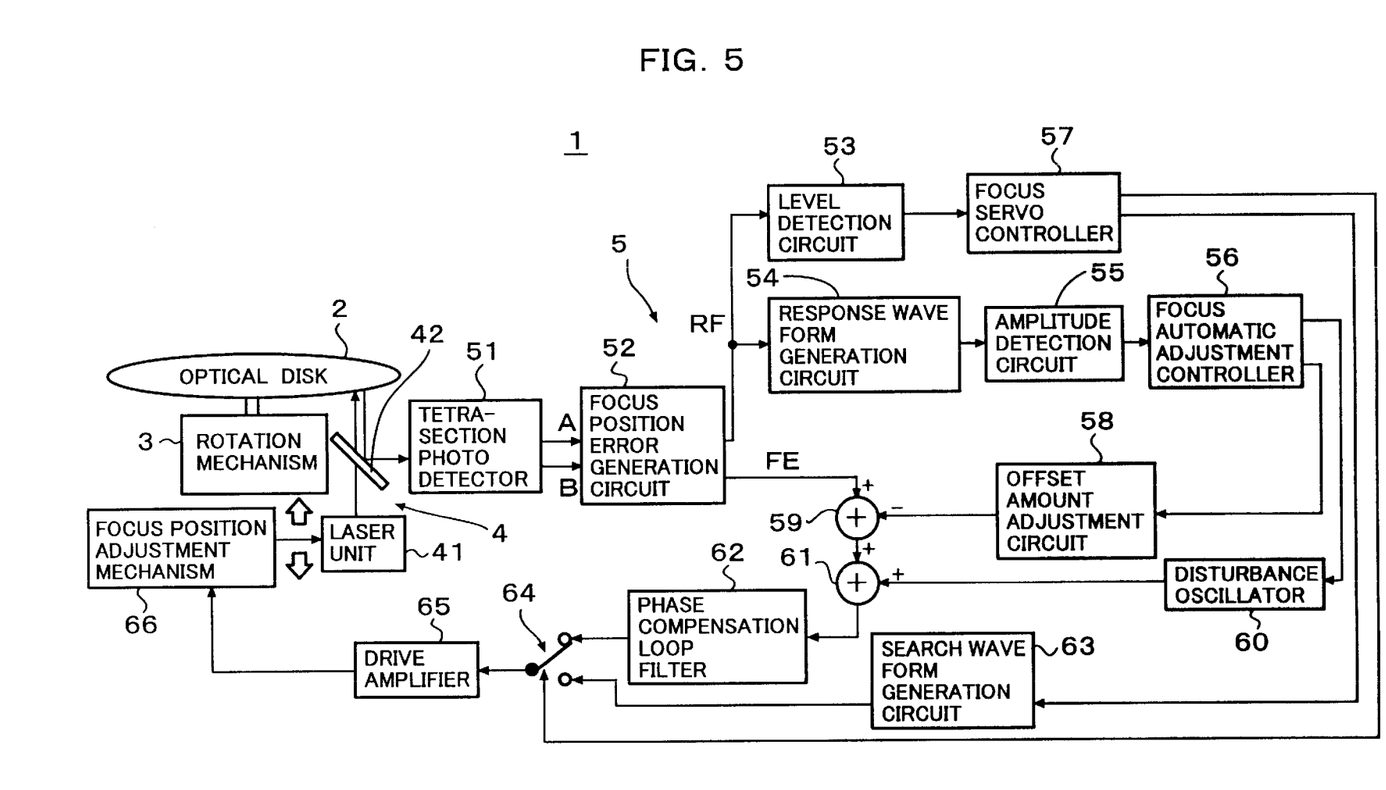
FIG. 5 is a block diagram for explaining a conventional focusing servo mechanism.

For these sorts of the optical disk reproducing devices, a focusing servo mechanism with a very high accuracy is required. FIG. 5 is a diagram for explaining such a focusing servo mechanism.

In FIG. 5, numeral 1 is a focusing servo mechanism, numeral 2 is an optical disk therefor, numeral 3 is a rotation mechanism therefor, and numeral 4 is an optical system therefor which is constituted by a laser unit 41 for irradiating laser beams onto the optical disk 2 and a half mirror 42. Numeral 5 is a focusing servo circuit which is constituted by a photo detector (pick-up) 51, a focus position error generation circuit 52, a level detection circuit 53, a response wave form generation circuit 54, an amplitude detection circuit 55, a focus automatic adjustment controller 56, a focus servo controller 57, an offset amount adjustment circuit 58, a signal level synthesis circuit 59 performing a subtraction synthesis of the signal levels, a disturbance oscillator 60, another signal level synthesis circuit 61 performing an addition synthesis of the signal levels, a phase compensation loop filter (a so called low pass filter of CR) 62, a search wave form generation circuit 63, a change over circuit 64, a drive amplifier 65 and a focus position adjustment mechanism 66.

Herein, the tetra-section photo detector 51 uniformly divides the sensor area into four sections and generates respective detection signals of the corresponding sectioned areas. The tetra-section photo detector 51 receives reflection beams from the half mirror 42 of the optical beams from the optical disk 2, converts the received optical beam amount irradiated on the respective areas into electrical signals, generates sum signals of opposing sensor areas in different directions as detection signals A and B and sends out the detection signals A and B to the focus position error generation circuit 52.

The focus position error generation circuit 52 generates a sum signal of the detection signals A and B as a detection signal RF with regard to the total received optical beam amount (which is a detection signal representing an optical beam amount of the reflection optical beams from the optical disk received by the photo detector, and is a signal corresponding to a reflection level of the reflection optical beams from the optical disk, and which is hereinbelow called as a RF detection signal RF), as well as generates a difference signal of the detection signals A and B as a position error signal FE (FE is an abbreviation of Focus Error). Among these signals, the position error detection signal FE is applied to the phase compensation loop filter 62 via the signal level synthesis circuits 59 and 61. Then, low pass components in the signal are extracted in the phase compensation loop filter 62 and are applied to the drive amplifier 65 under a condition of an automatic focus control (hereinbelow, called as a just focus control), and the drive amplifier 65 applies an output in a direction correcting the focus error depending on the level of the low pass components to the focus position adjustment mechanism 66 to drive the laser unit 41 so that the level of the position error detection signal FE is reduced and the focusing position is automatically adjusted to a focused position.

Further, the just focus control is effected in a direction so as to eliminate the position error depending on the level of the position error detection signal FE.

On the other hand, the RF detection signal RF is applied to the level detection circuit 53 to detect whether the RF detection signal RF falls within a range of the just focus control depending on the level thereof. When the RF detection signal RF reaches the level of the just focus control, the level detection circuit 53 detects the same and the detection signal thereof is inputted to the focus servo controller 57. When the focus servo controller 57 receives the detection signal from the level detection circuit 53, the focus servo controller 57 changes over the change over circuit 64 to the side of the phase compensation loop filter 62 and sends out the same to the drive amplifier 65. Thereby, the just focus control is effected.

Further, the change over circuit 64, for the first time, is set to the side of the search wave form generation circuit 63 which is designed to generate a ramp voltage for searching a just focus point by the focus servo controller 57 (the search wave form generation circuit is a so called ramp voltage generation circuit which generates signals which cause to advance or back the focusing position continuously with respect to the disk in order to search the focusing position), and in response to the rotation drive of the optical disk 2 the search wave form generation circuit 63 is activated by the focus servo controller 57 and outputs the ramp voltage to drive the drive amplifier 65. Thereby, the drive amplifier 65 drives the focus position adjustment mechanism 66, and the focus position adjustment mechanism 66 moves a focusing lens incorporated in the laser unit 41 depending on the ramp voltage so that the focusing position of the laser beams irradiated from the laser unit 41 onto the optical disk is raised from the lowest point. Thus, the level of the RF detection signal RF increases and in response to the detection signal of the level detection circuit 53 which detects the level thereof the control moves into a condition which permits the just focus control, and at this moment the above referred to change over of the change over circuit 64 is performed by the focus servo controller 57.

Further, the pick-up unit includes the tetrasection photo detector 51, the laser unit 45 having a laser beam source and a lens disposed in an optical passage of the laser beam source and the focus position adjustment mechanism 66 which moves the lens back and forth directions, and through movement by the focus position adjustment mechanism 66 of the focusing lens which is provided in the laser unit 41 and is disposed movably along the optical axis of the laser beams from the laser beam source, the focusing position of the laser beams which are outputted from the laser beam source onto the irradiation face of the optical disk 2 can be moved in back and forth directions. Further, herein either with the drive amplifier 65 or with the focus position adjustment mechanism 66 a so called negative feed back control is formed which receives the synthesized signal from the signal level synthesis circuit 61 via the phase compensation loop filter 62 and generates an output which drives the focusing lens in the direction for reducing the position error detecting signal FE.

Accordingly, at the moment when the change over circuit 64 is changed over to the side of the phase compensation loop filter 62, the focusing servo mechanism 1 moves into the just focus control. At this instance, the focus automatic adjustment controller 56 which has received a signal from the focus servo controller 57 activates the disturbance oscillator 60. The disturbance oscillator 60 generates, for example, a saw tooth wave of about 1 kHz as a disturbance signal. The disturbance signal is added via the signal level synthesis circuit 61 to the position error detection signal FE representing the output of the focus position error generation circuit 52, the added signal is applied to the phase compensation loop filter 62 and in response thereto the focus position adjustment mechanism 66 is controlled by the drive amplifier 65, thereby, the focusing position of the laser beams irradiated from the laser unit 41 is moved finely in vertical direction and the RF detection signal RF at the moment is inputted to the response wave form generation circuit 54, in which a response wave form is generated, and the amplitude thereof is detected by the amplitude detection circuit 55 and the detection signal is inputted to the focus automatic adjustment controller 56. The focus automatic adjustment controller 56 estimates sensitivity unbalance amounts of the sensor areas divided into four sections in the tetra-section photo detector 51 and sends out a signal for generating an offset depending on the unbalance amount to the offset amount adjustment circuit 58. Then, the disturbance signal from the disturbance oscillator 60 is stopped.

The offset amount adjustment circuit 58 generates in response to the input signal an output depending on the offset amount, and the output is applied to the negative side input (−) of the signal level synthesis circuit 59 and is synthesized by the signal level synthesis circuit 59 into the position error detection signal FE so as to subtract the level of the position error detection signal by the offset amount (if the offset amount is negative value, the subtraction result effects as an addition). Thereby, the sensitivity unbalance amounts of the sensor areas are corrected. As a result, in the focusing servo mechanism 1 the phase compensation loop filter 62 generates an output providing the just focus position in response to the position error detection signal FE and through the output corresponding to the offset amount from the offset amount adjustment circuit 58, the detection position offset due to the sensitivity unbalance is corrected as well as the laser beams irradiated from the laser unit 41 are focused onto the optical disk 2.

Figure 6:
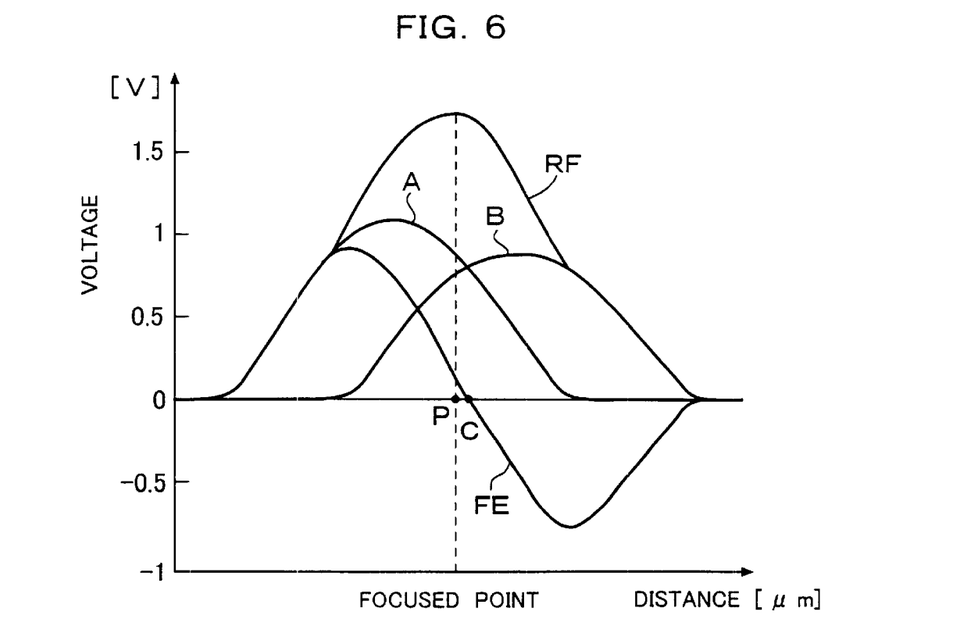
FIG. 6 is a diagram for explaining detection signals A and B of a tetra-section photo detector 51 and offset amount.

FIG. 6 is a diagram for explaining the detection signals A and B of the tetra-section photo detector 51 and the offset amount and illustrates a case in which the level of detection signal A is larger than the level of detection signal B. In the drawing, the ordinate denotes voltage (V) representing the detection level and the abscissa denotes distance ($\mu$m) from a reference position to a focus point.

From the drawing, it is observed that the zero cross point C of the position error detection signal FE representing a difference signal between the detection signals A and B is shifted to the right side with respect to the peak position P of the RF detection signal RF representing a sum signal of the detection signals A and B. When the relationship between the detection signals A and B is opposite as that indicated above, the zero cross point C will be shifted to the opposite direction.

Now, with the conventional focus control as has been explained above, if not the loop of the focus control enters into the just focus control, a just focusing of the optical beam source with respect to the optical disk can not be set. However, if subjected to an external vibration, the optical beam receiving position of the tetra-section photo detector 51 offsets, therefore, the automatic focusing servo loop can not be maintained with the just focus control.

Further, in order to form the automatic focusing servo loop, it is necessary to set the offset amount, for this purpose a circuit for generating a disturbance signal is indispensable,- and wherein a level adjustment of the disturbance signal is necessary so that the automatic focusing servo loop never goes out from a certain level. Therefore, the adjustment of the offset amount becomes difficult.

Still further, near the just focus point at which a signal wave form for searching a focus position is generated, the level of the response wave form with respect to the disturbance signal becomes small, therefore, a highly accurate detection is required for estimating the offset amount, in addition, since the unbalance amount depends on the tetra-section photo detector 51, readjustment is necessitated when parts are exchanged, moreover, it takes time for the readjustment.

SUMMARY OF THE INVENTION

An object of the present invention is to resolve the above mentioned conventional problems and to provide an optical disk reproducing device which eliminates a disturbance injection, permits a focusing with a further simple circuit, and increases an S/N ratio as well as unnecessitates a readjustment even when such as an external pick up unit is exchanged.

An optical disk reproducing device for achieving the above object and including a focus servo mechanism in which in response to reception of reflection beams from an optical disk by a photo detector, a received optical beam amount detection signal corresponding to the received optical beam amount and a position error detection signal with respect to a focusing position error are generated, and in response to the level of the detection signal of the received optical beam amount a focus servo controller is changed over to an automatic focus loop and through a control in a direction eliminating the position error depending on the detection signal of the position error laser beams from a laser beam optical source are automatically focused with respect to the optical disk, is characterized in that the focus servo mechanism comprises: a signal generation circuit which generates a signal for advancing or backing a focusing position of the laser beams with respect to the optical disk; a maximum value detection circuit which detects the maximum value of the detection signal of the received optical beam amount; and a level holding circuit which holds the level of the detection signal of the position error at the moment in response to the detection signal from the maximum value detection circuit, wherein the focus servo controller drives the signal generation circuit and causes to detect the maximum value through the maximum value detection circuit without changing over to the automatic focus loop, and thereafter performs a control of changing over to the automatic focus control, and after synthesizing the level of the detecting signal of the position error held in the level holding circuit and the level of the current detection signal of the position error an automatic focusing is performed in the automatic focus control.

Now, in the focus servo mechanism for an optical disk as has been explained in the section of CONVENTIONAL ART, namely, in the focus servo mechanism in which in response to reception by the photo detector of reflected optical beams from the optical disk, the RF detection signal RF and the position error detection signal FE are generated, and in response to the level of the RF detection signal RF the focus servo controller moves into the automatic focus control by changing over to the automatic focus loop and through a fine movement of the focusing position of the laser beams in response to the position error detection signal FE the optical beams from the laser beam source are automatically focused with respect to the optical disk, since the maximum peak position of the RF detection signal RF corresponds to the focusing position, if the control moves under a condition of the automatic focus control near the maximum peak position, an automatic focusing can be performed through the automatic focus loop control.

Further, at the focused position corresponding to the maximum peak position of the detection signal RF the level of the position error detection signal FE is primarily to have to assume "0", therefore, the difference component from "0" corresponds to the offset caused by the sensitivity unbalance of the sensor areas.

Now, as a specific example of the level holding circuit, for example, a memory circuit which stores the level can be used. In such instance, in correspondence with the maximum peak position of the RF detection signal RF the level the position error detection signal FE is stored and the level stored under the condition of just focusing servo as representing the offset amount can be synthesized with the level of the position error detection signal FE. Further, the maximum value detection circuit can be modified to a detection circuit of the maximum peak value and the minimum peak value, and as a specific example of the level holding circuit a circuit which holds an average value of the maximum peak and minimum peak values can be used. In this instance, after detecting the maximum peak value and the minimum peak value of the levels of the position error detection signal FE the average value thereof is calculated, and using the average value as the offset amount the level of the position error detection signal FE is synthesized.

Since, the offset amount of the position error detection signal FE from the zero crossing point corresponds to the offset caused by the sensitivity unbalance of the sensor areas, in such case, when the zero crossing point is shifted to a positing representing the average value of the maximum peak value and the minimum peak value of the levels of the position error detection signal FE, the offset can be corrected.

As has been explained, according to the present invention, with the provision of the level holding circuit, by sampling the level of the detection signal of the focusing position error when the detection signal representing the received optical beam amount shows the maximum value as the offset amount and by holding the same in advance in the level holding circuit without changing over to the automatic focus loop, the held level is utilized under a condition of the just focusing servo to effect the automatic focusing.

In the above two cases, the storage of the offset amount based on the position error detection signal FE or the calculation of the average value is performed under a condition other than the automatic focusing servo condition. Thereby, influences due to disturbance noises are eliminated and no disturbance oscillator is required. As a result, with a further simple circuit the focusing can be performed without injecting disturbances and S/N ratio can be enhanced. Moreover, a readjustment is unnecessitated even when such as an external pick-up parts are exchanged.

DESCRIPTION OF THE PREFERRED EMBODIMENTS

Figure 1:
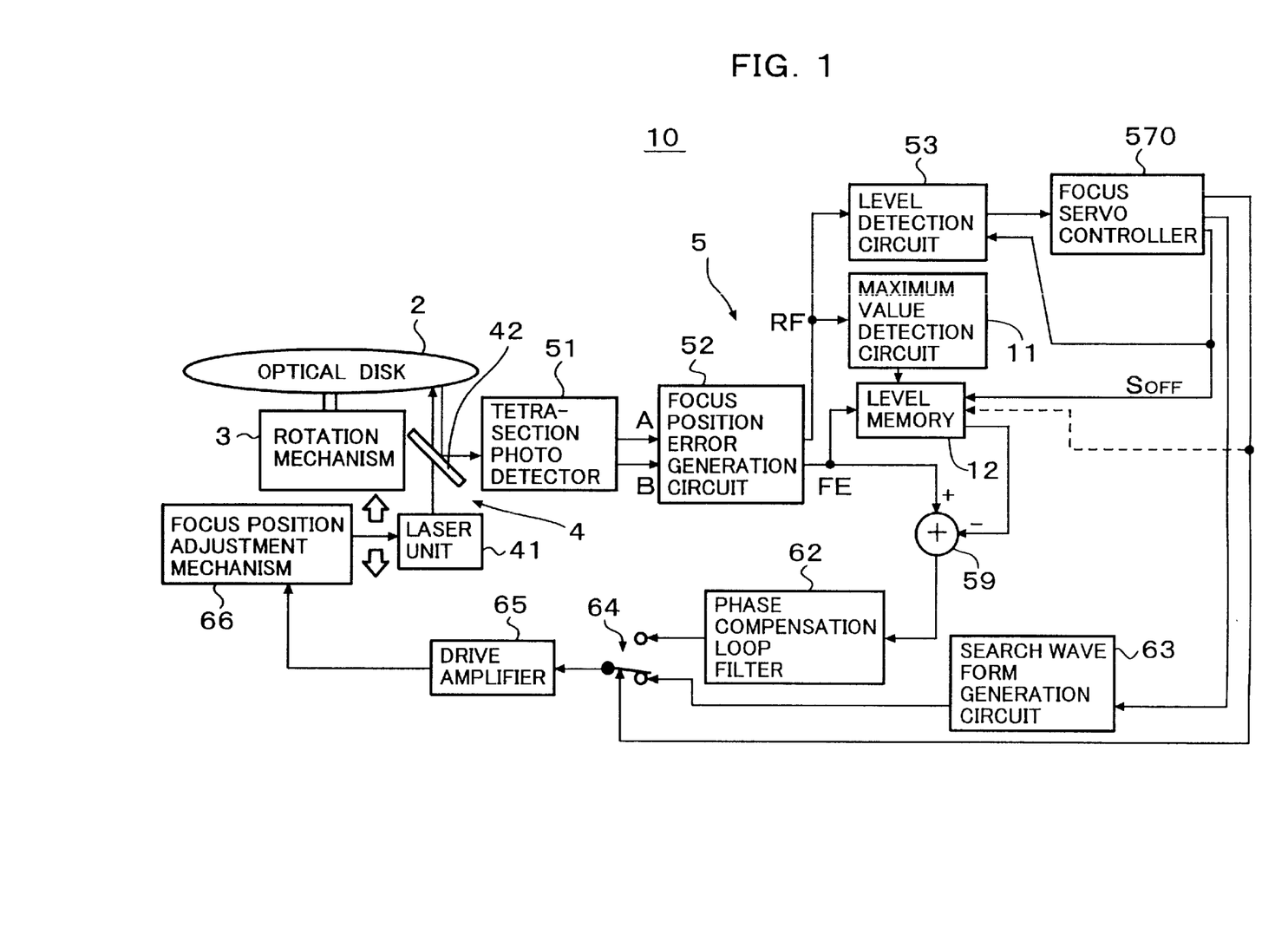
FIG. 1 is a block diagram of one embodiment including primarily a focusing servo mechanism for an optical disk reproducing device to which the present invention is applied.

In FIG. 1, the same or equivalent constitutional elements as in FIG. 5 are designated by the same reference numbers as in FIG. 5, and the explanation thereof is omitted.

In FIG. 1, numeral 10 is a focusing servo mechanism from which the response wave form generation circuit 54, the amplitude detection circuit 55 and the focus automatic adjustment controller 56 in FIG. 5 are excluded. In place thereof, a maximum value detection circuit 11 and a level memory circuit 12 are provided. Further, in place of the focus servo controller 57 in FIG. 5 a focus servo controller 570 is provided. The focus servo controller 570, in addition to the processing function of the focus servo controller 57 in FIG. 5, further sends out an automatic focusing servo OFF control signal SOFF (hereinafter, called so a servo OFF control signal SOFF) to the level detection circuit 53 and the level memory circuit 12. When the level detection circuit 53 receives a servo OFF control signal SOFF, the level detection circuit 53 stops its operation. Further, when the level memory circuit 12 receives a servo OFF control signal SOFF, the level memory circuit 12 is set under a condition of storing an input signal.

The focus servo controller 570 at first generates a servo OFF control signal SOFF, samples an offset value under a condition of not entering into a just focus control (hereinbelow, called as a focusing servo OFF condition) and stores the same in the level memory circuit 12, and subsequently performs a control for entering into the just focus control.

The maximum value detection circuit 11 receives RF detection signals RF outputted from the focus position error generation circuit 52 and detects the maximum value thereof, and is, for example, constituted by a holding circuit which holds an immediately prior voltage and a comparator which compares the voltage held in the holding circuit with the present voltage, and when the present voltage drops below the immediately prior voltage, generates a detection voltage. When the voltage value held in the holding circuit is reset by the detection signal and initialized, and only the detection signal is outputted. Further, the maximum value detection circuit 11 is designed so as not to respond to a momentary level drop such as noises.

The level memory circuit 12 is a so called sample hold circuit, receives a position error detection signal FE outputted from the focus position error generation circuit 52 and, in response to the detection signal from the maximum value detection circuit 11 when receiving the servo OFF control signal SOFF, stores the level of the position error detection signal FE at the moment. Further, when not receiving the servo OFF control signal SOFF, the level stored depending upon the detection signal from the maximum value detection circuit 11 is outputted.

Further, other than the detection signal from the maximum value detection circuit 11, the outputting of the level stored in the level memory circuit 12, can be performed after receiving a control signal as indicated by a dotted line in response to a change over signal to the just focus control transmitted from the focus servo controller 570 to the change over circuit 64. In short, it is sufficient if the outputting of the level held is performed under the condition of the just focus control.

Now, the focus servo operation of the focusing servo mechanism 10 will be explained, at first the focus servo controller 570 generates the servo OFF control signal SOFF and drives the search wave form generation circuit 63. Further, as has been explained in connection with FIG. 5, the change over circuit 64 at first is set at the side of the search wave form generation circuit 63 by the focus servo controller 570, and the focus servo controller 570 activates the search wave form generation circuit 63 to generate a ramp voltage to drive the drive amplifier 65. At this instance, the optical disk 2 can either be rotating or can be in a stand still.

The drive amplifier 65 drives the focus position adjustment mechanism 66 and raises the focusing position of the laser beams irradiated on to the optical disk 2 from the laser unit 41 depending on the ramp voltage by the focus position adjustment mechanism 66 via the drive amplifier 65. At this moment, since the operation of the level detection circuit 53 is stopped by the servo OFF control signal SOFF, the change over circuit 64 can never be changed over to the just focus control.

At the time when the search of one time (a plurality of times is also acceptable) is completed by moving the focus position of the laser beams once from the lower most point to the higher most point, the maximum value detection circuit 11 detects the maximum value of the RF detection signal RF near the just focus point and the level memory circuit 12 receives the detection signal. As a result, the level of the position error detection signal FE at this moment is stored in the level memory circuit 12.

Subsequently, the focus servo controller 570 stops the servo OFF control signal SOFF and drives the search wave form generation circuit 63. At this instance, the level detection circuit 53 is brought into an operating condition. Further, the level memory circuit 12 is set at a condition ready for outputting the stored level. Accordingly, the change over circuit 64 is changed over to the just focus control by the focus servo controller 570 depending on the detection signal of the level detection circuit 53 which detects the level of the RF detection signal RF, namely, the connection toward the side of the phase compensating loop filter 62 is effected. Then, the offset value stored in the level memory circuit 12 in response to the detection signal of the maximum value detection circuit 11 or the change over signal is outputted to the signal level synthesis circuit 59. Thereby, the automatic focusing servo loop is formed, and an output which induces the just focus position is generated from the phase compensation loop filter 62 in response to the position error detection signal FE.

At this time, the detection position offset components due to sensitivity unbalance of the respective sensor areas in the tetra-section photo detector 51 is corrected with regard to the position by an output corresponding to the offset amount from the level memory circuit 12 and the irradiating laser beams from the laser unit 41 are focused on to the irradiation plane of the optical disk 2.

Figure 2:
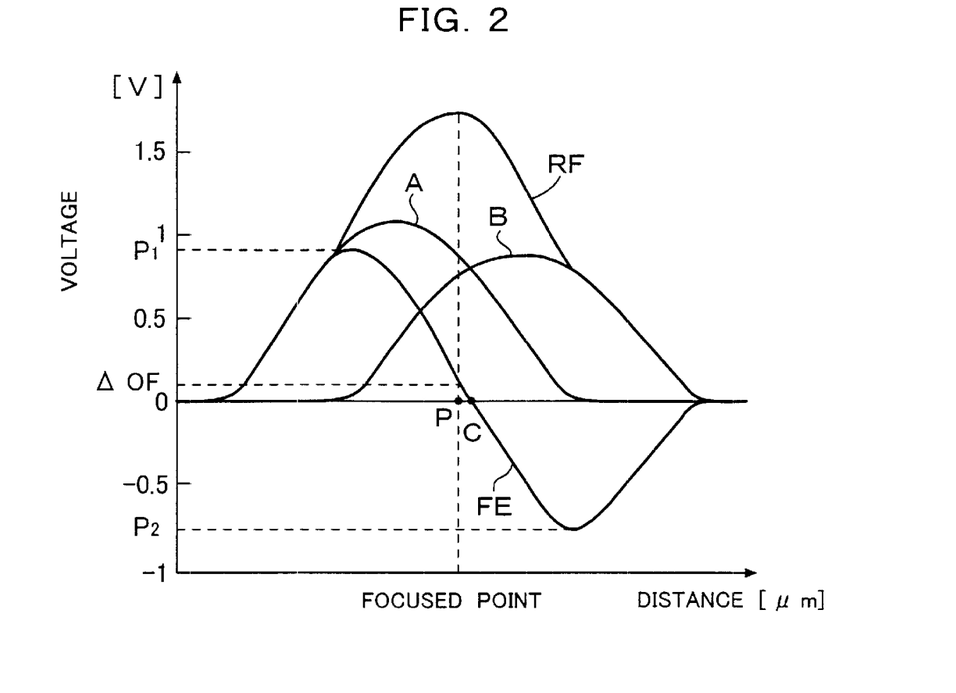
FIG. 2 is a wave form diagram when performing the focusing operation in the embodiment in FIG. 1.

FIG. 2 is a diagram for explaining the operation thereof and corresponds to FIG. 6. In the above embodiment, the offset amount (offset level) stored with respect to the maximum value of the RF detection signal RF detected by the maximum value detection circuit 11 assumes $\Delta OF$. Since the just focus position corresponds to the maximum peak position P, if the level of the position error output FE is subtracted by the $\Delta OF$, the position P of the maximum peak value assumes "0" level of the position error output FE thereby to automatically set at the just focus position.

Figure 3:
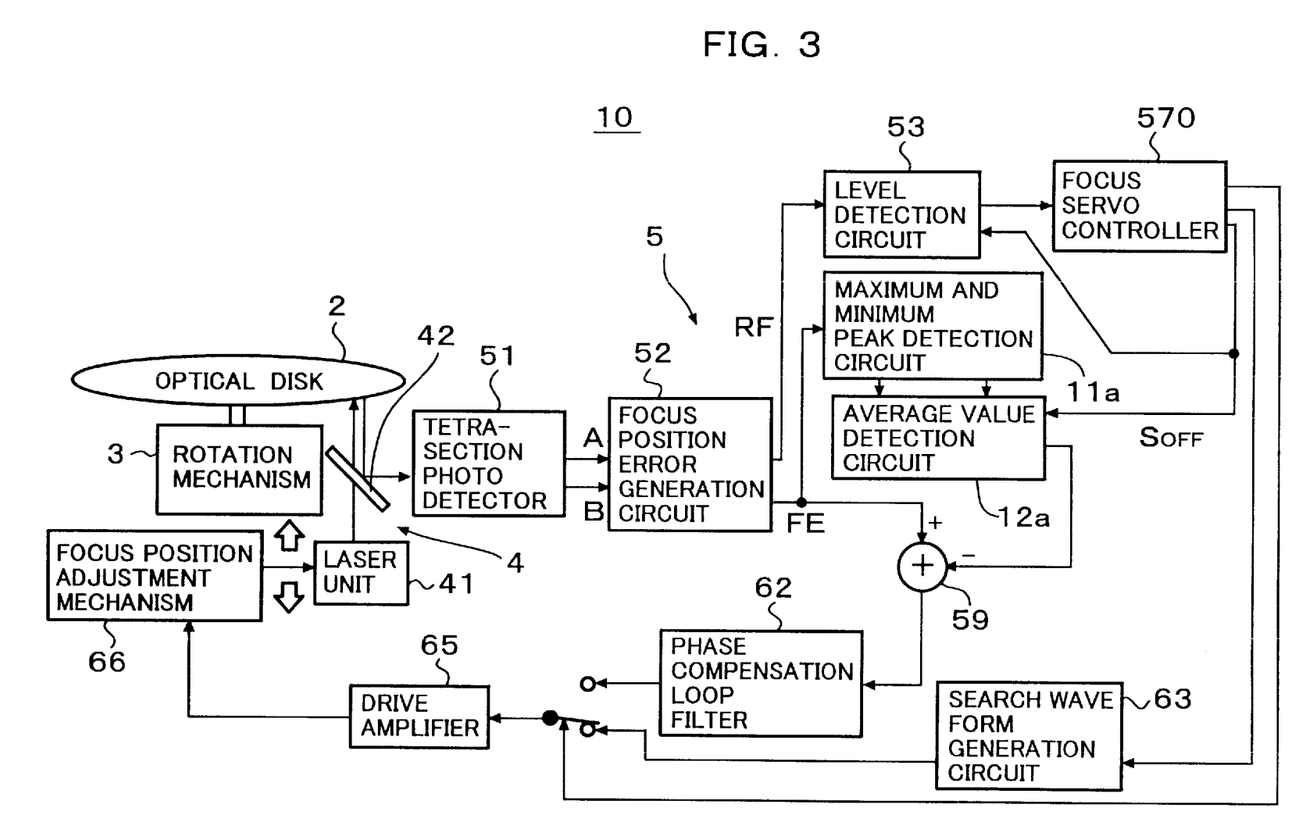
FIG. 3 is a block diagram of another embodiment according to the present invention.

FIG. 3 is another embodiment in which, in place of the maximum value detection circuit 11 in FIG. 1, a maximum and minimum peak detection circuit 11a for the position error detection signal FE is provided, and in place of the level memory circuit 12 an average value detection circuit 12a is provided which calculates or detects an average value of the peak levels of the maximum and minimum position error detection signals FE. The average value detection circuit 12a includes hold circuits which receive maximum and minimum peak levels outputted from the maximum and minimum peak detection circuit 11a like the level detection circuit 12 and hold respectively these levels, the respective hold circuits hold the maximum and minimum peak levels upon receipt of the servo OFF control signal SOFF, and outputs an average value of the voltage levels held during a time when the servo OFF control signal SOFF is stopped.

The average value is outputted to the signal level synthesis circuit 59 as the offset value and is subtracted from the position error detection signal FE as the average value component. Thereby, the automatic focusing servo loop is formed and the output which induces the just focus position is generated from the phase compensation loop filter 62 in response to the position error detection signal FE.

Further, with respect to the average value held at the average value detection circuit 12a when a servo OFF control signal SOFF is received, the previous hold value is reset.

As the operation thereof, through detection of the maximum peak level P1 (see the ordinate) and the minimum peak level P2 (see the ordinate) of the position error detection signal FE as shown in FIG. 2, the average level thereof is inputted as an offset value $\Delta OF=(p1+P2)/2$. Since the vicinity of the position P of the maximum peak value corresponds to the level "0" of the position error detection signal FE, an automatic setting is effected at the just focus position.

Further, the focusing servo operation of the focus servo controller 570 in the present embodiment is as same as that shown in FIG. 1.

Figure 4:
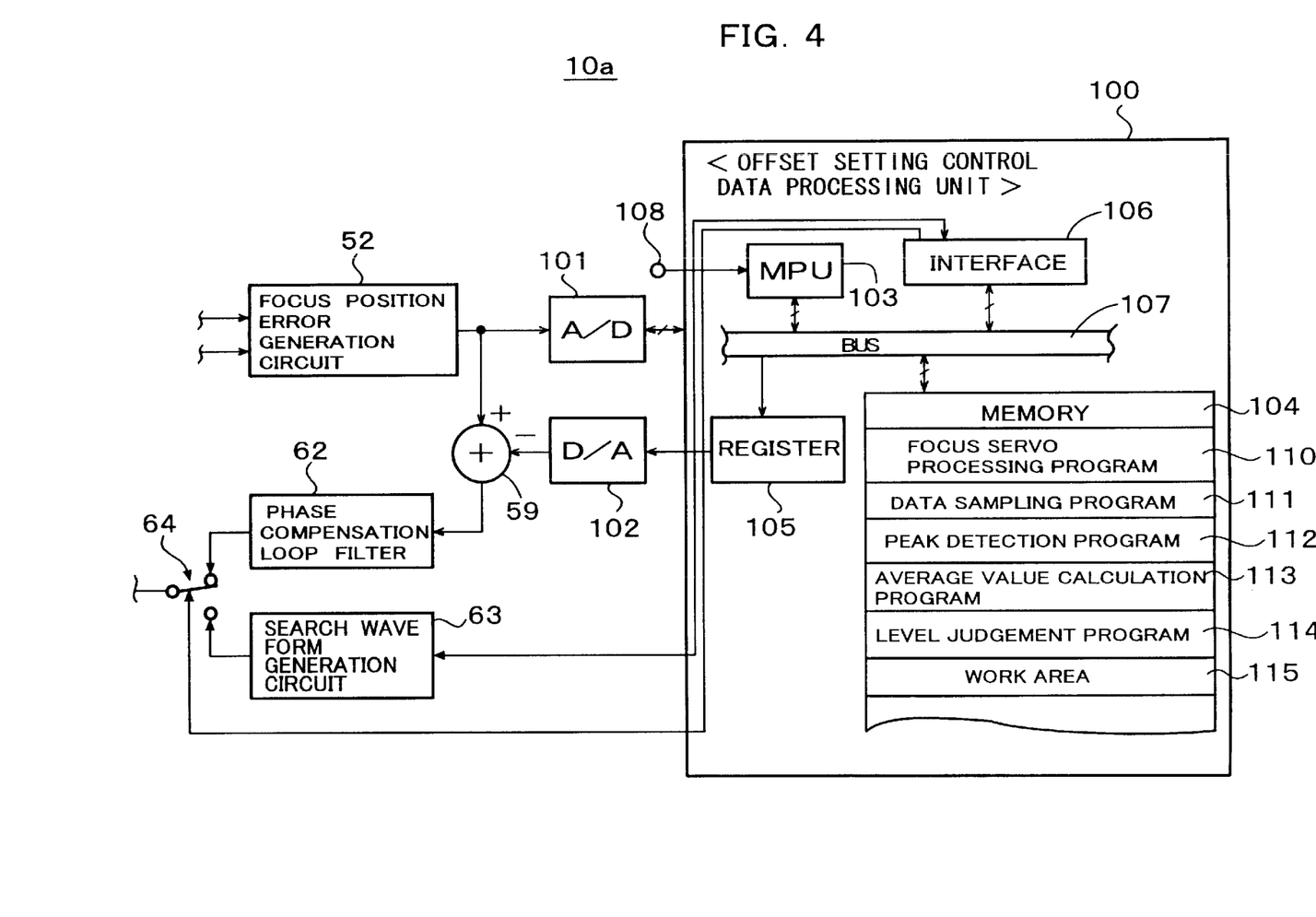
FIG. 4 is a block diagram of still another embodiment in which the focusing servo control according to the present invention is performed through software programs.

The focusing servo mechanism 10a in FIG. 4 is an embodiment in which the respective functions including the level detection circuit 53, the servo focus controller 570, the maximum and minimum peak detection circuit 11a and the average value detection circuit 12a in FIG. 3 are respectively realized by a MPU and programs executed thereby. Therefore, in place of the level detection circuit 53, the servo focus controller 570, the maximum and minimum peak detection circuit 11a and the average value detection circuit 12a in FIG. 3, an offset setting control unit 100 is provided.

Between the control unit 100 and the focus position error generation circuit 52 an A/D converter circuit (A/D) 101 for converting an analogue value to a digital value is provided, and between the control unit 100 and the signal level synthesis circuit 59 a D/A converter (D/A) 102 for converting a digital value to an analogue value is provided.

The offset setting control data processing unit 100 includes therein a MPU 103, a memory 104, a register 105 for setting an offset amount and an interface 106 which are mutually connected via a bus. In the memory 104 a focus servo processing program 110, a data sampling program 111, a peak detection program 112, an average value calculation program 113 and a level judgement program 114 are stored, and a work area 115 is further provided. The search wave from generation circuit 63 is activated via the interface 106.

Herein, the focus servo processing program 110 and the data sampling program 111 are the programs which realize the function of the focus servo controller 570, the peak detection program 112 is a program which realizes the function of the maximum and minimum peak value detection circuit 11a, the average value calculation program 113 is a program which realizes the respective functions of the average value detection circuit 12a, and the level judgement program 114 is a program which realizes the function of the level detection circuit 53.

The MPU 103 in the offset setting control unit 100 executes the focus servo processing program 110 upon receipt of an activation signal from an external system control unit. Numeral 108 is an input terminal of the activation signal.

Further, when an activation signal is received, the focus servo processing program 110 at first operates so that the data in the register 105 is reset at "0". Thereby, when an automatic focusing servo loop is not formed, the same condition is realized as when the servo OFF control signal is generated in the respective previous embodiments. Further, in this instance, no change over signal is sent out to the change over circuit 64 from the MPU 103 via the interface 106. For this reason, the control is not placed in the just focus control condition. Namely, with regard to connection at the initial condition, the change over circuit 62 is connected to the side of the search wave form generation circuit 63.

Further, the activation signal from the external system control unit inputted into the activation signal input terminal 108 is sent out with a predetermined period in synchronism with the timing to be focused under the operating condition thereof, and when a power source is ON.

When the focus servo processing program 110 is executed by the MPU 103, the data in the register 105 is reset and the data sampling program 111 is called. The data sampling program 111 activates the search wave form generation circuit 63. At this instance, the condition in which the servo OFF control signal is generated in the above respective embodiments is provided. After executing the data sampling program 111, the peak detection program 112, the average value calculation program 113 and the level judgement program 114 are successively called and the data of the offset amount obtained through completing the execution of the average value calculation program 113 is set to the register 105 at the automatic focusing servo loop. At the same time, the change over signal is sent out to the change over circuit 64 from the MPU 103 via the interface 106. As a result, the change over circuit 64 is connected to the side of the phase loop filter 62 and the control moves into the just focus control.

As a result, the D/A 102 applies an analogue voltage corresponding to the offset amount to the signal level synthesis circuit 59, and the automatic focusing servo loop is formed like FIG. 3 embodiment, thereby, the automatic focusing is effected, which corresponds to the condition when the servo OFF control signal is stopped.

The data sampling program 111 is called by the focus servo processing program 110, and when the data sampling program 111 is executed by the MPU 103, the MPU 103 activates the search wave form generation circuit 63 via the interface 106, samples sampling data successively in a predetermined period from the A/D 101 and writes the same in the work area 115 of the memory 104. When completing a search of one time, the activation of the search wave from generation circuit 63 is stopped. Then, the focus servo processing program 110 calls the peak detection program 112. When the peak detection program 112 is executed in the MPU 103, the MPU 103 detects the maximum peak value and the minimum peak value from the data in the work area and stores the same in a predetermined area in the memory 104.

When the above processings are completed, the focus servo processing program 110 calls the average calculation program 113. When the average value calculation program 113 is executed in the MPU 103, a sum of the maximum peak value and the minimum peak value stored in the predetermined area in the memory 104 is taken, then the average value is calculated by dividing the sum by 2. Alternatively, instead of taking an arithmetic means, a root means square can be used.

The focus servo processing program 110 sets the obtained average value at the register 105 as the offset value and calls the level judgement program 114.

When the level judgement program 114 is executed in the MPU 103, the MPU 103 activates the search wave form generation circuit 63 via the interface 106, samples the sampling data successively in a predetermined period from the A/D 101 and reads in the same in the work area 115 of the memory 104. Then, it is judged whether or not the read in data value falls within a range in which the automatic focusing servo loop is formed. When the data value falls in the range, the activation of the search wave form generation circuit 63 is stopped, the average value set to the register 105 and the change over signal is sent out to the circuit 64. Thereby, the automatic focusing servo loop is formed which permits the automatic focusing.

Further, since the processing contents of the respective processing programs have been explained in detail according to the processing order as above, a flow chart illustration covering the entire processings is omitted.

Although the above processings corresponds to FIG. 3 embodiment, FIG. 1 embodiment can also be realized by program processings. Specifically, in place of the peak detection program 112 and the average value calculation program 113, it is sufficient if a maximum value detection processing program is provided which receives the RF detection signal RF via the A/D converter circuit and detects the maximum value of the levels of the RF detection signal RF and which corresponds to the maximum value detection circuit 11, and further only the level of the detected maximum value is stored in the memory 104.

Further, in the above embodiment, for the sake of explanation convenience, although the function of the search wave form generation circuit 63 is not performed through a program processing, since the function thereof is also a simple one which causes to generate a ramp voltage, the circuit can, of course, be realized through a program processing.

According to the embodiments as has been explained hitherto, the storage or the average value calculation of the offset amount based on the position error detection signal FE is carried out in a condition other than the automatic focusing servo condition, however, such storage or calculation can be performed every time prior to the automatic focusing servo control, further, the storage or the average value calculation of the offset amount can also be performed periodically in a predetermined period.

Still further, in the present embodiment, by raising the focusing position of the laser beams with respect to the optical disk from the lower most point, the focusing point of the laser beams is continuously advanced, however, contrary thereto, it is also permissible to perform a backing movement in which the focusing position of the laser beams is lowered from the higher most point.

Still further, in the signal level synthesis circuits 59 and 61 according to the present embodiments in which the level of the detection signal of the position error is synthesized with the level of the other signal, therefore, if the signal to be synthesized is a negative value, the adding synthesis operates as a subtracting synthesis and the subtracting synthesis operates as an adding synthesis, therefore, any signal level synthesis circuits either adding or subtracting can be used.

What is claimed is:

1. An optical disk reproducing device including a focus servo mechanism in which in response to reception of reflection beams from an optical disk by a photo detector, a received optical beam amount detection signal corresponding to the received optical beam amount and a position error detection signal with respect to a focusing position error are generated, and in response to the level of the detection signal of the received optical beam amount a focus servo controller is changed over to an automatic focus loop and through a control in a direction eliminating the position error depending on the detection signal of the position error, laser beams from a laser beam optical source are automatically focused with respect to the optical disk, characterized in that the focus servo mechanism comprises: a signal generation circuit which generates a signal for advancing or backing a focusing position of the laser beams with respect to the optical disk; a maximum value detection circuit which detects the maximum value of the detection signal of the received optical beam amount; and a level holding circuit which holds the level of the detection signal of the position error at the moment in response to the detection signal from the maximum value detection circuit, wherein the focus servo controller drives the signal generation circuit and causes to detect the maximum value through the maximum value detection circuit without changing over to the automatic focus loop, and thereafter performs a control of changing over to the automatic focus control, and by synthesizing the level of the detecting signal of the position error held in the level holding circuit and the level of the current detection signal of the position error, an automatic focusing is performed in the automatic focus control.

2. An optical disk reproducing device according to claim 1, wherein the focus servo mechanism further comprises a signal level synthesis circuit which synthesizes to the signal level of the position error detection signal with the level of the output signal obtained from the level holding circuit, wherein the level holding circuit is a memory circuit which stores the level of the position error detection signal and the output signal of which is generated under a condition when the control is changed over to the automatic focus loop.

3. An optical disk reproducing device according to claim 1, wherein the maximum value detection circuit is a maximum peak value and minimum peak value detection circuit which detects both maximum peak value and minimum peak value of the position error detection signal, the level holding circuit is an average value holding circuit which receives the maximum peak value and the minimum peak value from the maximum peak value and minimum peak value detection circuit, calculates the average value thereof and holds the same, and the output signal of the average value holding circuit is generated under a condition when the control is changed over to the automatic focus loop.

4. An optical disk reproducing device according to claim 1, wherein at least the functions of the maximum value detection circuit, the level holding circuit and the focus servo controller are realized by a processor and processing programs executed by the processor.

5. An optical disk reproducing device according to claim 2, wherein at least the functions of the maximum value detection circuit, the level holding circuit and the focus servo controller are realized by a processor and processing programs executed by the processor.

6. An optical disk reproducing device according to claim 3, wherein at least the functions of the maximum peak value and minimum peak value detection circuit, the level holding circuit and the focus servo controller are realized by a processor and processing programs executed by the processor.

7. An optical disk reproducing device according to claim 1, wherein the signal generation circuit generates a signal wave form for searching the focusing position through advancing or backing the focusing position with respect to the optical disk.

8. An optical disk reproducing device according to claim 7, the focus servo mechanism further comprises a laser unit which includes the laser beam optical source and a focusing lens which is movably disposed on an optical axis of the laser beams from the laser beam optical source, a drive circuit, a focus position adjustment mechanism which moves the focusing position through movement of the lens driven the drive circuit, a loop filter, and a change over circuit which selects either the output of the search wave form generation circuit or the output of the loop filter and sends out a selected output to the drive circuit, the focus servo controller performs the change over to the automatic focus loop by changing over the change over circuit from the output of the search wave form generation circuit to the output side of the loop filter.

9. An optical disk reproducing device according to claim 8, wherein the focus servo mechanism further comprises a signal level synthesis circuit which synthesizes to the signal level of the position error detection signal with the level of the output signal obtained from the level holding circuit, wherein the level holding circuit is a memory circuit which stores the level of the position error detection signal and the output signal of which is generated under a condition when the control is changed over to the automatic focus loop.

10. An optical disk reproducing device according to claim 8, wherein the maximum value detection circuit is a maximum peak value and minimum peak value detection circuit which detects both maximum peak value and minimum peak value of the position error detection signal, the level holding circuit is an average value holding circuit which receives the maximum peak value and the minimum peak value from the maximum peak value and minimum peak value detection circuit, calculates the average value thereof and holds the same, and the output signal of the average value holding circuit is generated under a condition when the control is changed over to the automatic focus loop.

* * * * *